United States Patent Office 3,164,552
Patented Jan. 5, 1965

3,164,552
PROCESS FOR CONTROLLING THE GROWTH AND REPRODUCTION OF MICROORGANISMS
Leonard L. Wolfson, Tinley Park, Ill., assignor to Nalco Chemical Company, a corporation of Delaware
No Drawing. Filed Dec. 24, 1958, Ser. No. 782,635
18 Claims. (Cl. 252—8.55)

This invention is concerned with new and improved microbiocidal agents and their use in the control of microorganisms commonly found in industrial process waters. More particularly, it is related to a new class of bactericides which are effective in the control of sulfate reducing bacteria under aqueous conditions where high concentrations of dissolved inorganic salts are prevalent.

One of the most difficult problems encountered in the use of known microbiocides in the treatment of the various types of industrial process waters is that the agents now available tend to be relatively specific as to the various species of microorganisms upon which they operate. Thus, while a microbiocide might be extremely effective in controlling fungi such as *Aspergillus niger,* it would not necessarily be effective in controlling an anaerobic species of bacteria.

One of the most difficult species of bacteria to control are the well known sulfate reducing bacteria, when their environment is composed of water containing relatively large amounts of dissolved inorganic salts. Under these environmental conditions, very few microbiocides will show any inhibition of sulfate reducing bacteria regardless of the dosage at which they are employed. Also, the few compounds found to be effective often require relatively large dosages in order to give satisfactory results, thereby increasing the cost of treating large quantities of water. It is known that most of the microbiocides are toxic to humans and animals in high concentrations, and for this reason it is considered important to avoid the use of highly toxic compounds in any concentration and to use the less toxic compounds in as low concentrations as possible. See, for example, the discussion by R. C. Allred, "The Role of Microorganisms," Producers Monthly, vol. 18, No. 4, page 18.

The most difficult industrial problem associated with sulfate reducing bacteria is in high brines which are frequently encountered in the process known as water flooding.

When an oil well ceases to flow by the natural pressure in the formation and/or substantial quantities of oil can no longer be obtained by the usual pumping methods, various processes are sometimes used for the treatment of the oil-bearing formation in order to increase the flow of oil. These processes are usually described as secondary recovery processes. One such process which is used quite frequently is the water flooding process wherein water is pumped under pressure into what is called an "injection well" and oil, along with quantities of water, that have been displaced from the formation, are pumped out of an adjacent well usually referred to as a "producing well." The oil which is pumped from the producing well is then separated from the water that has been pumped from the producing well and the water is pumped to a storage reservoir from which it can again be pumped into the injection well. Supplementary water from other sources may also be used in conjunction with the produced water. When the storage reservoir is open to the atmosphere and the oil is subject to aeration, this type of water flooding system is referred to herein as an "open water flooding system." If the water is recirculated in closed system without substantial aeration, the secondary recovery method is referred to herein as a "closed flooding system."

The water which is introduced into the injection wells may vary considerably in composition from one field to another. Frequently it contains relatively large quantities of dissolved salts such as sodium chloride and therefore can be described as a brine. It may also contain other salts such as those of calcium, magnesium, barium and strontium. Some iron salts may likewise be present. In some cases these salts are added to a fresh water to prevent clay minerals from swelling and sealing off porous oil sands, but in most instances their occurrence is natural.

It would be a valuable contribution to the art if a class of microbacterial agents were available which were effective in the control of sulfate reducing bacteria particularly in processes using waters containing substantial quantities of inorganic salts. Also beneficial would be a group of bactericides which would act to effectively control a wide variety of microorganisms, including the sulfate reducing bacteria, at a low economical dosage.

It, therefore, becomes an object of the invention to provide a new process for controlling the growth of microorganisms with microbiocides which are effective in the control of sulfate reducing bacteria when such are found in the presence of waters containing relatively large amounts of dissolved inorganic salts.

Another object is to provide such control of sulfate reducing bacteria by the use of a microbiocide at low dosage in a liquid medium. Such object includes controlling the growth of a large variety of microorganisms in addition to the sulfate reducing bacteria.

An additional object is to provide new and useful water flooding processes.

A further object is to provide improved aqueous liquids useful as injection fluids in the secondary recovery of petroleum by water flooding. Other objects will appear hereinafter.

In accordance with the invention, it has been found that sulfate reducing bacteria in a liquid aqueous medium containing dissolved inorganic salts may be effectively controlled in their growth and reproduction cycles by treating such bacteria with a biologically active amount of a halogen substituted nitroparaffin which contains from two to not more than six carbon atoms in chain length. This class of microbiocidal agents is also effective in controlling a large variety of other species of bacteria, fungi and algae of the types most commonly found in industrial process waters. They are effective against most strains of bacteria, including the sulfate reducing bacteria, at dosages ranging from 0.5 part per million to 100 parts per million with excellent results generally being obtained at dosages no larger than between 5–25 parts per million.

While halogen substituted nitroparaffins falling within the above defined limits are considered as being useful in the practices of the invention, a specific and extremely valuable group of these compounds are those halogen substituted nitroparaffins having a general structural formulae designated below:

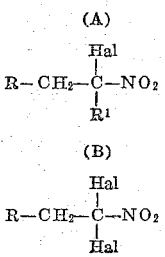

In the above formulae, R and R¹ will be either hydrogen or a lower acyclic hydrocarbon group. Since the compounds of the invention should not contain more than 6 carbon atoms, the sum of R and R¹ should not exceed 4 carbon atoms in chain length. Hal in the above formulae represents fluorine, chlorine, bromine or iodine.

It is apparent from the structure shown above that the preferred compounds of the invention have the halogen and nitrogen substituents on the same carbon atom. When more than one halogen atom is contained in the compound, it is preferred that the halides be gem dihalides (i.e., the halogen atoms are attached to the same carbon atom). The preferred compounds should also contain not more than 2 halogen atoms. Although, for purposes of the invention, more than two halogen atoms may be present, no particular advantage is obtained when such multiple halogen substituents are contained in the nitroparaffin molecule.

Examples of specific halogen substituted nitroparaffins that may be used as microbiocidal agents are listed below in Table I.

TABLE I

| Composition No.: | Halogen substituted nitroparaffin |
|---|---|
| I | 1-chloro-1-nitropropane. |
| II | 1-chloro-1-nitroethane. |
| III | 1-bromo-1-nitrohexane. |
| IV | 1-iodo-1-nitroethane. |
| V | 2-chloro-2-nitroethane. |
| VI | 1,1-dichloro-1-nitropropane. |
| VII | 3-bromo-1-nitropentane. |
| VIII | 1-fluoro-1-nitroethane. |

Of the compounds shown above, the most useful are 1-chloro-1-nitropropane, 1,1-dichloro-1-nitropropane, 1-chloro-1-nitroethane and 2-chloro-2-nitropane.

The two to six carbon atom halogen-containing nitroparaffins are relatively non-volatile and can be handled and used at concentrations according to the invention without toxic effects upon humans, domestic animals and the like. By comparison, halogen substituted nitromethanes are unsatisfactory for use in treating any industrial process waters for the control of microorganisms due to the toxicity problems associated with the use of these materials. For example, trichloronitromethane, more commonly known as chloropicrin, is a well known systemic poison and is exteremly dangerous to handle.

Nearly all the compounds of the invention are soluble in water at use concentrations. When more concentrated solutions are desired, it is necessary to first prepare a concentrated solution of the halogen substituted paraffin in a low molecular weight inert organic solvent such as isopropanol, acetone, dimethylformamide and the like. When it is desired to dilute concentrated formulae with water, it is preferable first to add to the halogen substituted nitroparaffin a high molecular weight amino compound as a carrier, preferably a higher monoalkyl substituted primary amine salt (e.g., lauryl amine, oleyl amine, Duomeen C, or the like, in the form of the acetate salts) or a higher monoalkyl substituted imidazoline of the type shown below in the form of a salt, e.g., the acetate, which is preferably formed in situ:

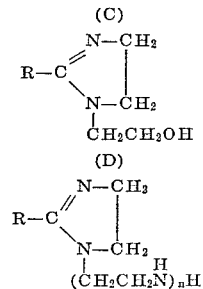

where R is a higher alkyl group containing from 5–21 atoms in chain length and $n$ is a small whole number not greater than 3, e.g., compound C where R is heptadecenyl, or the hydrocarbon radical from tall oil; or compound D where R is heptadecenyl or the hydrocarbon radical of tall oil, and $n$ is 1 or 2.

The amounts of higher alkyl substituted amine or imidazoline required to form water soluble complexes with halogen substituted nitroparaffins are from 1.5 to 2 moles of organic nitrogen base to one mole of halogen substituted nitroparaffin. In the case of substituted imidazolines where there are one or more basic nitrogen atoms attached to the heterocyclic ring in the 1-position, each basic nitrogen atom may be considered as an individual mole of product for the purpose of forming these complexes. When the basic portion of the imidazoline is in the ring, only one of the nitrogen atoms is reactive.

To aid in maintaining the stability of formulae containing halogen substituted nitroparaffins and higher alkyl substituted primary amines or imidazolines, it is often desirable to add minor amounts of mineral acids, or lower molecular weight organic carboxylic acids such as acetic acid. The amount of acid necessary depends on the particular solvent and components of the formula. The quantity of acid generally will never exceed 10% by weight of the total formulation.

The higher alkyl substituted amines or imidazolines, while aiding in the preparation of the water base formula, have the added advantage of rendering such formulation relatively non-corrosive where the corrosivity of formulations is important. Many corrosion-inhibiting and film-forming high molecular weight amines and imidazolines are known in the art and are valuable additives in compositions containing the biologically active agents of the present invention. In general, these corrosion-inhibiting compounds are characterized by at least one basic nitrogen atom in a hydrocarbon structure containing from about 12 up to as high as 72 carbon atoms. It is sometimes beneficial to add additional corrosion inhibitors such as, for instance, polyphosphates, alkali metal nitrites, alkali metal nitrates, alkali metal borates and alkali metal chromates, to insure that the products will be noncorrosive to both ferrous and nonferrous metals. It is also beneficial to add other biologically active agents to those of the present invention for specific formulations. The halogenated nitroparaffins having 2 to 6 carbon atoms retain their effectiveness under a wide variety of conditions and are compatible with most additives which one would expect to find in the aqueous compositions of water flooding processess.

The invention is further illustrated by the following examples.

*Example I*

In order to determine the microbiocidal efficiency of the halogen substituted nitroparaffins the following two test methods were employed.

TEST METHOD A.—SCREENING INHIBITION TEST

Culture media:

| | | |
|---|---|---|
| Sodium lactate (60%) | ml | 4.0 |
| Yeast extract | gm | 1.0 |
| Ascorbic acid | gm | 0.1 |
| MgSO₄.7H₂O | gm | 0.2 |
| K₂HPO₄ (anhydrous) | gm | 0.01 |
| Fe(SO₄)₂(NH₄)₂.6H₂O | gm | 0.1 |
| NaCl | gm | 10.0 |
| Deionized water | ml | 1000.0 |

The ingredients were dissolved by stirring, and the pH was adjusted to 7.2–7.5 with 6 N NaOH. The media was then autoclaved at 15 lb./15 minutes and was ready for use in the test.

The organisms were a culture of sulfate reducers (Desulfovibrio) that were obtained from the American Petroleum Institute and were designated as API-A culture. The inocula for the tests were from the third successive 24 hour transfer, and showed blackening after each 24 hour transfer.

Stock solutions of the bacteriostat to be screened were prepared as 0.9% solutions by weight in ethanol. On the day of the test, 0.09% solutions by volume were prepared in deionized water from the stock solutions and were the working solutions for the tests.

To sterile 18 ml. screw capped test tubes sufficient amounts of the chemicals being tested were added to give the desired concentration of bacteriostat in 18 ml. After addition of the chemical, the room temperature media, to which had been added 10 ml. of culture per liter, was poured carefully into the screw cap tubes to completely fill them, care being taken that no liquid was allowed to overflow from the tubes. Duplicate tubes were prepared in every dilution in addition to a control tube which contains no chemical. The tubes were tightly capped so that no air was entrapped.

The tubes were incubated at 37° C. for 7 days and then observed for results. Growth of the sulfate reducers was evinced by intense blackening of the tubes, while inhibition of growth showed no change in appearance.

The desired concentrations of chemicals were obtained in the 18 ml. tubes by adding the following amounts from the 0.09% solution.

| Concentration (p.p.m.): | Amount of solution |
|---|---|
| 100 | ml__ 2.0 |
| 50 | ml__ 1.0 |
| 40 | ml__ 0.8 |
| 30 | mml__ 0.6 |
| 20 | ml__ 0.4 |
| 10 | ml__ 0.2 |
| 5 | ml__ 0.1 |
| 1 | ml__ 0.02 |

TEST METHOD B

In this method, known as the gas tube method, the subculture medium consisted of 24 grams of dextrose, 1 gram of Basaminbact (Anheuser-Busch), added to 1 liter of Chicago tap water and sterilized by autoclaving under 15 pounds of pressure for 15 minutes. An appropriate amount of 18 to 24 hour old nutrient broth culture of *A. aerogenes* or *A. niger* was mixed with 200 ml. of culture medium immediately before starting the tests. The amount of culture was such as to give one million organisms per ml. of medium. 20 ml. of the inoculated culture medium was placed in each of a series of fermentation tubes with caps. Without touching the sides of the tubes a given amount of chemical to be tested was introduced using an appropriate concentration of stock chemical to avoid more than a 5% error in final dilution. For this purpose the volume of chemical introduced should be 1 ml. or less. The chemical and inoculated medium were mixed gently.

A control test was also run in which the chemical was omitted and 1 ml. of water substituted. In mixing, each tube was inverted in such a manner as to fill the upright closed end of the tube with test liquid. The tubes were incubated at 30° C. for 24 hours. At the end of one hour contact and again after 24 hours contact, a loopful of the test mixture with withdrawn from each tube and inoculated in a subculture tube containing 10 ml. of sterile nutrient broth. The subculture tubes were incubated at 37° C. for 48 hours and examined for growth. The results of these tests recorded in parts per million (p.p.m.) indicated one and 24 hour killing ranges. The gas production for inhibition level was recorded at 48 hours.

Using the above described test methods, the following results were obtained:

TABLE II

| Formula | Screening Inhibition Test (Sulfate Reducers) | | Aerobic Inhibition Test (Aerobes) | |
|---|---|---|---|---|
| | 1% Brine | 10% Brine | 24 Hrs. | 48 Hrs. |
| 1-Chloro-1-Nitropropane | 1-2.5 | 1-2.5 | | 10-25 |
| 1-1-Dichloro-1-Nitropropane | 5-10 | 5-10 | | 10 |
| 1-Chloro-1-Nitroethane | 5-10 | 5-10 | | |
| 2-Chloro-2-Nitropropane | 30-40 | 10-20 | | |
| 1-3-Dichloropropane | 50 | 50 | | |
| 1-Nitropropane | 100 | 100 | | |
| 2-Nitropane | 100 | 100 | | |

From the above table, it is observable that the halogen substituted nitroparaffins of the invention usually have the same inhibition range in controlling sulfate reducing bacteria regardless of whether the brine concentration is dilute or concentrated. This fact is believed to be significant since it is well known that most bactericidal agents are relatively ineffective in the presence of concentrated brines.

For purposes of comparison it will be seen from Table II that the nitroparaffins and the chlorinated paraffins are not comparable to the halogen substituted nitroparaffins in their activity against sulfate reducing bacteria. The 1-chloro-1-nitropropane provides exceptionally good results at a very low dosage.

*Example II*

The following composition illustrates a concentrate prepared for the practice of the invention.

| Ingredients: | Percent by weight |
|---|---|
| Imidazoline of Formula D where $n$ is 1 and R is the hydrocarbon radical from tall oil containing 70% to 90% by weight of fatty acids and having a molecular weight within the range of 340 to 364 | 41.2 |
| Acetic acid | 8.8 |
| Isopropanol | 15.0 |
| 1-chloro-1-nitropropane | 10.0 |
| Water | 25.0 |

*Example III*

The following composition illustrates another concentrate prepared for the practice of the invention.

| Ingredients: | Percent by weight |
|---|---|
| Imidazoline of formula C where R represents hydrocarbon radicals from tall oil | 20 |
| Acetic acid | 4 |
| Isopropanol | 25 |
| 1-chloro-1-nitropropane | 12 |
| Water | 39 |

In the compositions described in Examples II and III the high molecular weight amino compounds serve as carriers and are normally present in proportions of about 1.5 to 5 times the weight of the biologically active halogen substituted nitroparaffin. These high molecular weight amino compounds also act as corrosion inhibitors.

For purposes of clearly defining the scope of the invention, when reference is made to dilute and concentrated brines, it is meant to be inferred that concentrated brines include those solutions containing at least 3% by weight of dissolved inorganic salts and encompasses those solutions of inorganic salts which contain the saturation solubility of inorganic salts. The expression "microorganisms" includes such biological genera as bacteria, fungi and algae. The term "amino compound" is intended to include both the primary amines and imidazolines and their salts.

In addition to being treated agents for water-flooding operations, the compositions are excellent treating agents for the control of microorganisms found in salt water disposal wells.

This application is a continuation-in-part of copending application, Serial No. 717,807, filed February 27, 1958, now abandoned.

The invention is hereby claimed as follows:

1. The method of controlling the growth of sulfate reducing bacteria in a liquid aqueous medium containing dissolved inorganic salts which comprises treating said bacteria in such medium with a biologically active amount of a halogen substituted nitroparaffin containing from 2 to not more than 6 carbon atoms in chain length.

2. The method of controlling the growth of sulfate reducing bacteria in concentrated brines containing such bacteria which comprises treating said brines with a biologically active amount of halogen substituted nitroparaffin having the structural formula from the group consisting of:

(A)
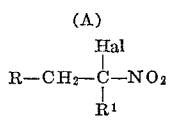

and (B)
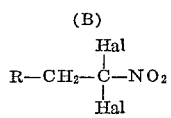

where R and R¹ are from the group consisting of hydrogen and lower acyclic hydrocarbon groups with the proviso that the sum of R and R¹ is not greater than 4 carbon atoms, and Hal represents halogen.

3. The method of claim 2 where the halogen substituted nitroparaffin is 1-chloro-1-nitropropane.

4. The method of claim 2 where the halogen substituted nitroparaffin is 1,1-dichloro-1-nitropropane.

5. The method of claim 2 where the halogen substituted nitroparaffin is 1-chloro-1-nitroethane.

6. The method of claim 2 where the halogen substituted nitroparaffin is 2-chloro-2-nitropropane.

7. In a flooding process for the recovery of oil from oil-bearing subterranean formations, the improvement which comprises flooding the oil-bearing subterranean formation with an aqueous liquid containing in excess of about 2–5 parts per million of a halogen substituted nitroparaffin having the structural formula from the group consisting of:

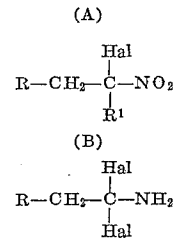

where R and R¹ are from the group consisting of hydrogen and lower acyclic hydrocarbon groups with the proviso that the sum of R and R¹ is not greater than 4 carbon atoms, and Hal represents halogen.

8. In a process of secondary oil recovery characterized by the step of injecting flooding water into oil-bearing subterranean formations to displace portions of the residual oil therein, the improvement comprising having present in said injected flooding water in excess of about 3–10 p.p.m. of a dichlornitroalkane having the following formula:

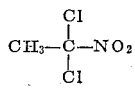

9. In a process of secondary oil recovery characterized by the step of injecting flooding water into oil-bearing subterranean formations to displace portions of the residual oil therein, the improvement comprising having present in said injected flooding water in excess of about 3–10 p.p.m. of a dichloronitroalkane having the following formula:

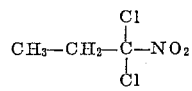

10. In a flooding process for the recovery of oil from oil-bearing subterranean formations, the improvement which comprises flooding the oil-bearing subterranean formation with an aqueous liquid containing about 5 to 25 parts per million of 1 chloro-1-nitropropane.

11. An aqueous liquid useful as an injection fluid in the secondary recovery of petroleum by water flooding which comprises a major proportion of an aqueous brine which contains at least 3% by weight of dissolved inorganic salts, and at least 0.5 part per million of a halogen substituted nitroparaffin having the structural formula from the group consisting of:

(A)
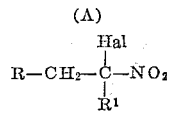

and (B)
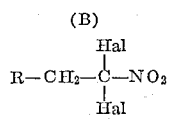

where R and R¹ are from the group consisting of hydrogen and lower acyclic hydrocarbon groups, with the proviso that the sum of R and R¹ is not greater than 4 carbon atoms, and Hal represents halogen.

12. The aqueous liquid of claim 11 where the halogen substituted nitroparaffin is 1-chloro-1-nitropropane.

13. The aqueous liquid of claim 11 where the halogen substituted nitroparaffin is 1,1-dichloro-1-nitropropane.

14. The aqueous liquid of claim 11 where the halogen substituted nitroparaffin is 1-chloro-1-nitroethane.

15. The aqueous liquid of claim 11 where the halogen substituted nitroparaffin is 2-chloro-2-nitropropane.

16. The aqueous liquid of claim 11 which contains from at least 0.5 to about 25 parts per million of the halogen substituted nitroparaffin.

17. An aqueous liquid as claimed in claim 11 which contains a high molecular weight amino compound as a carrier for said nitroparaffin, said amino compound having at least one basic nitrogen atom in a hydrocarbon structure containing from about 5 to 72 carbon atoms, such that said amino compound provides from 1.5 to 2 moles of organic nitrogen base to 1 mole of halogen substituted nitroparaffin.

18. An aqueous liquid as claimed in claim 11 which contains a high molecular weight imidazoline as a carrier for said nitroparaffin, said imidazoline containing a hydrocarbon group having from 5 to 21 carbon atoms, such that said imidazoline provides from 1.5 to 2 moles of organic nitrogen base to 1 mole of halogen substituted nitroparaffin.

(References on following page)

References Cited in the file of this patent

UNITED STATES PATENTS

| | | |
|---|---|---|
| 1,502,174 | Chapman | July 22, 1924 |
| 1,707,727 | Kampa et al. | Apr. 2, 1929 |
| 2,246,524 | Kyrides | June 24, 1941 |
| 2,281,239 | Hass | Apr. 28, 1942 |
| 2,419,021 | Harnden | Apr. 15, 1947 |
| 2,692,231 | Stayner et al. | Oct. 19, 1954 |
| 2,733,206 | Prusick et al. | Jan. 31, 1956 |
| 2,738,325 | Rydell | Mar. 13, 1956 |
| 2,763,962 | Hardy | Sept. 25, 1956 |
| 2,839,467 | Hutchinson et al. | June 17, 1958 |

FOREIGN PATENTS

| | | |
|---|---|---|
| 107,419 | Australia | May 25, 1939 |
| 421,189 | Italy | Mar. 19, 1947 |